US007956719B2

(12) United States Patent
Anderson, Jr. et al.

(10) Patent No.: US 7,956,719 B2
(45) Date of Patent: Jun. 7, 2011

(54) BUILDING CONTROL SYSTEM COMMUNICATION SYSTEM TIMING MEASUREMENT ARRANGEMENT AND METHOD

(75) Inventors: Thomas Anderson, Jr., Lakemoor, IL (US); Bruno P. Landou, Elmhurst, IL (US)

(73) Assignee: Siemens Industry Inc., Alpharetta, GA (US)

( * ) Notice: Subject to any disclaimer, the term of this patent is extended or adjusted under 35 U.S.C. 154(b) by 1371 days.

(21) Appl. No.: 11/473,303

(22) Filed: Jun. 22, 2006

(65) Prior Publication Data
US 2007/0069850 A1    Mar. 29, 2007

Related U.S. Application Data

(60) Provisional application No. 60/722,060, filed on Sep. 29, 2005.

(51) Int. Cl.
*G05B 23/02* (2006.01)
(52) U.S. Cl. ..................................... 340/3.51; 340/7.55
(58) Field of Classification Search ................. 340/3.43, 340/3.44, 825.22, 3.1, 3.5, 3.51, 825.23; 700/14, 15
See application file for complete search history.

(56) References Cited

U.S. PATENT DOCUMENTS

| 4,019,172 | A  | * | 4/1977  | Srodes ........................... 714/822 |
| 5,621,417 | A  | * | 4/1997  | Hassan et al. ................. 342/457 |
| 6,348,793 | B1 | * | 2/2002  | Balloni et al. ................ 324/309 |
| 2002/0144537 | A1 | * | 10/2002 | Sharp et al. .................. 73/31.01 |

FOREIGN PATENT DOCUMENTS
JP         06121002        *   4/1994

OTHER PUBLICATIONS
English Abstract of JP 06121002.*

* cited by examiner

*Primary Examiner* — Brian A Zimmerman
*Assistant Examiner* — Yong Hang Jiang (57) ABSTRACT

An arrangement for handling communication messages in a building control system includes a communication circuit and a control device. The communication circuit is operable to provide a first message on a communication network to a remote building control system device and to receive a responsive message generated by a remote building control system device responsive to the first message. The communication circuit is further operable to perform a first operation if the responsive message is received within a first time-out period and to perform a second operation if the responsive message is received after a first time-out period has expired. The control device is operable to generate a plurality of different time-out period values corresponding to a plurality of building control system devices and to provide information identifying the plurality of different time-out period values and their corresponding building control system devices to the communication circuit.

18 Claims, 6 Drawing Sheets

BUILDING CONTROL SYSTEM COMMUNICATION SYSTEM TIMING MEASUREMENT ARRANGEMENT AND METHOD

This application is a continuation of U.S. Patent Application Ser. No. 60/722,060, filed Sep. 29, 2005.

FIELD OF THE INVENTION

The present invention relates generally to building control systems, including but not limited to security systems, fire safety systems, and HVAC systems, and more particularly, to building control systems having communication systems that enable remote and/or centralized monitoring of system operations.

BACKGROUND OF THE INVENTION

Building control systems are systems that are employed to regulate and control various environmental and safety aspects of commercial, industrial and residential facilities (hereinafter referred to as "buildings"). In ordinary single-family residences, control systems tend to be simple and largely unintegrated. However, in large buildings, building control systems often consist of multiple, integrated subsystems employing hundreds of elements.

One example of a building control system is a heating, ventilation and air-conditioning ("HVAC") building control system. An HVAC system of a large building or building complex operates in part by interrelating small, local control loops with larger control loops to coordinate the delivery of heat, vented air, and chilled air to various locations throughout the building. Local control systems may, among other things, open and close vents that supply heated or chilled air based on local room temperature readings. Larger control loops may, among other things, obtain many distributed temperature readings and/or air flow readings to control the speed of a ventilation fan, or control the operation of heating or chilling equipment.

As a consequence of the interrelationship of these control loops, many elements of a building control system must communicate information to each other. To this end, communication networks have been incorporated that transmit digital data between and among the various elements in accordance with one or more sets of protocols.

Some of the elements of a sophisticated building control system that can communicate information include field controller devices, supervisory control stations, sensors and actuators. Sensors and actuators are the terminal devices of the building control system. Sensors measure and/or collect raw data regarding the system, and actuators physically change the output of the system. Sensors may include temperature sensors, humidity sensors, air flow sensors and the like. Actuators may include devices that alter fan speed, alter the position of ventilation shaft dampers, or alter the flow of hot water through heating pipes. Field controller devices may be used to control localized portions of the system, while supervisory control stations provide overall control and monitoring of the entire system, or at least large parts of the system.

Other types of building control systems, for example, fire safety and security systems, also include distributed actuators and/or sensors as well as field controllers and supervisory control stations.

One desirable feature of control systems is the ability to access system-wide data from many diverse elements at the supervisory control station. Such system-wide data may include, for example, room temperatures, water valve positions, and air flow values. Such information allows the supervisory control station to monitor sensed conditions, track maintenance conditions of devices, monitor alarm conditions and so forth. Such system-wide access is provided via the communication network of the building control system.

By way of example, the APOGEE™ brand of building automation system available from Siemens Building Technologies, Inc. of Buffalo Grove, Ill. employs a multi-tier network to facilitate communication of data to and from centralized supervisory control stations. The supervisory control station used in an APOGEE™ system is an INSIGHT™ work station, also available from Siemens Building Technologies, Inc. The INSIGHT™ work station uses Ethernet networks and various communication protocols to perform communications with field controllers and the like. Field controllers and other intermediary devices may further connect to other devices (e.g. actuators and sensors) via floor-level networks. Ideally, the supervisory control station may access system data from systems devices on the floor-level networks via the field controllers and/or other intermediary devices.

One issue that arises in building control system communication networks is the cohesive handling of communication messages in a timely manner. Various applications in a supervisory control station may require multiple communications with various remote devices in short periods of time. Such communications are carried out via messages transmitted over the building communication network.

One typical building control system communication message consists of a query by a supervisory control station to another device, requesting a response. The response may merely be an acknowledgement, or may also include data requested in the query, such as a temperature value, or valve position value. Because communication networks for large building control systems can become large and vast, there is a possibility for message communication to be delayed. When messages are delayed, a query from a supervisory control message can be left open (i.e. without answer) for an extended period of time. As is known in the building control system field, an open query to another remote device monopolizes resources and reduces the capacity for one or more devices to service other communication needs. Accordingly, an open query that is held open indefinitely due to a communication error can reduce the responsiveness of a building control system.

To address these issues, certain communication systems employ time-out procedures that limit the amount of time a query message may be left open. If an answer to a query message is not received within a predefined time, then the querying device releases the query/request and no longer uses system resources to await a response. The querying device may generate another query/request, or abandon the operation altogether.

One communication module currently used in building control systems is the BACstac™ module, a software module that implements the BACnet open protocol to effectuate communications between centralized control systems and various control system devices. BACstac™ is a product name of Cimetrics, Inc., located in Boston, Mass. This BACstac™ module receives requests from an application within a building system workstation or control station and formulates an appropriate data request in the BACnet protocol. The BACstac™ module then transmits the request over the communication network (via a physical layer communication interface) to the appropriate device and awaits a return message. If a return message including a response to the query is received by the BACstac™ module, then the BACstac™ module provides the data to the application within the control station or workstation that formulated the request.

However, if a return message is not received within a time-out limit, then the BACstac™ module abandons the open query and informs the building system workstation application that a response has not been timely received. The building system workstation application may then handle the error in an appropriate manner, including possibly forming another request for the data. In any event, the building system application and the BACstac™ module resources are not forced to await indefinitely for the response to the original request.

While the above system reduces problems with the unavailability of system resources due to delayed or failed communication messages, there can be problems related to too many messages being canceled due to delay, such that applications will not obtain the data they require. There also can remain system resource allocation issues even with the time-out features.

As a consequence, there is a need for system and method that can alleviate problems associated with communication delays in a building control system that balances the need for allowing system resources to be released from processes involving lost or delayed communication messages and the need to allow for delays in communications.

SUMMARY OF THE INVENTION

The present invention addresses one or more of the above needs, as well as others, by providing a system wherein time-out values for reply messages to be received from one or more devices in a building control network may be custom configured for each of a plurality of building control system devices, or wherein custom time-out values may be generated based on the results of test response times. In some embodiments, the configurable time-out values described above allow the time-out threshold to be extended for devices in which communications may normally take longer, and/or to be shortened for devices in which communications normally take less time.

A first embodiment of the invention is an arrangement for handling communication messages in a building control system that includes a communication circuit and a control device. The communication circuit is operable to communicate messages with building control system devices via a communication network. The control device is operably coupled to the communication circuit, and is operable to cause the communication circuit to communicate a first message to a first building control system device, the first message configured to cause the first building control device to generate a responsive message. The control device is further operable to perform a first operation if the responsive message is received via the communication circuit within a first time-out period, and to perform a second operation if the responsive message is received via the communication circuit after a first time-out period has expired. The control device is further configured to generate a plurality of different time-out period values corresponding to a plurality of building control system devices, the plurality of different time-out period values including a value identifying the first time-out period.

The above-described embodiment takes into account that communication delays between objects of the building control network vary according to network topology and hardware configuration (e.g. presence of routers, etc.). To account for such varied delays, the above-described embodiment employs a plurality of different time-out period values for different devices.

The above described features and advantages, as well as others, will become more readily apparent to those of ordinary skill in the art by reference to the following detailed description and accompanying drawings.

DETAILED DESCRIPTION

Figure 1:
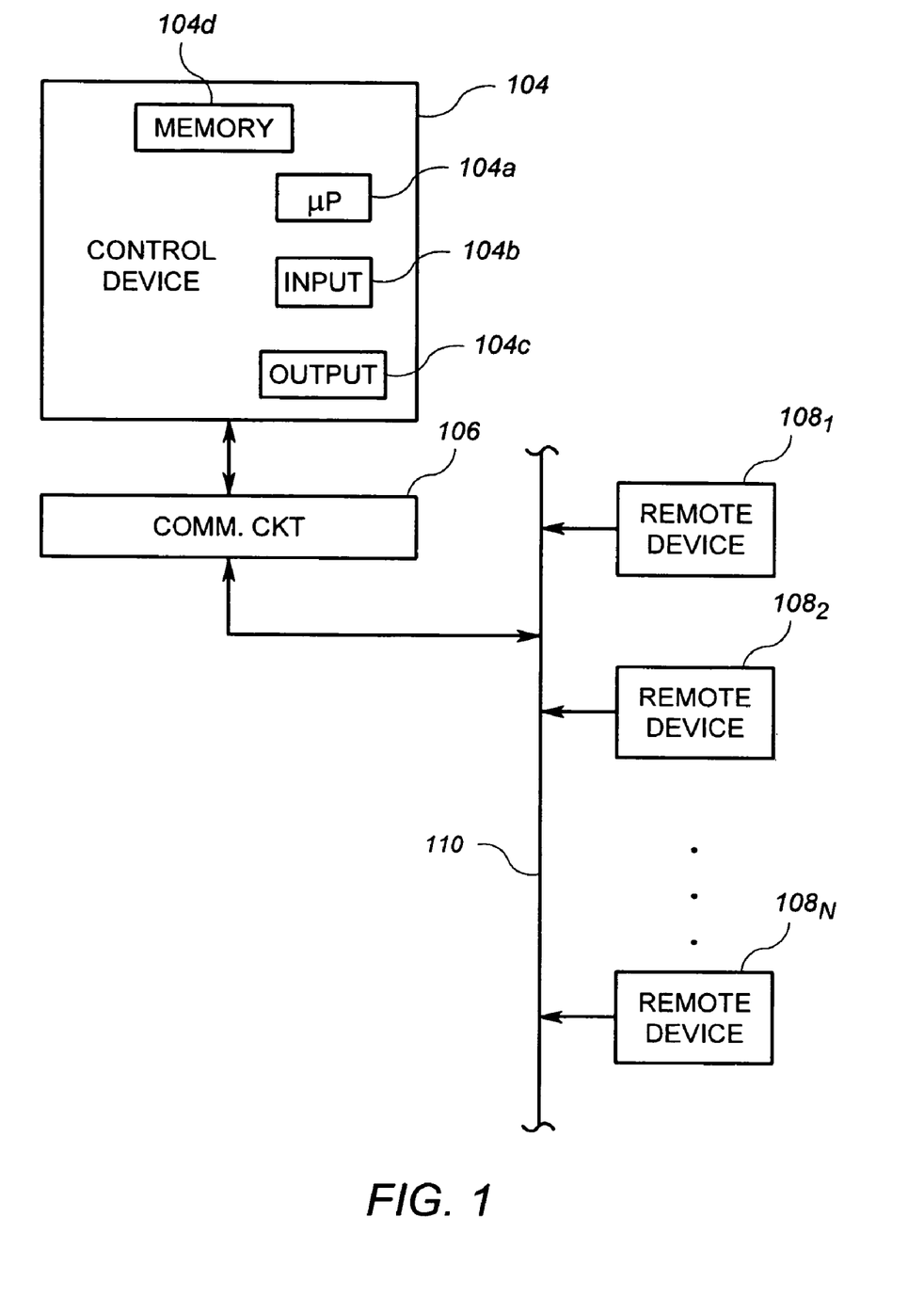
FIG. 1 shows an exemplary arrangement for handling communication messages in a building control system in accordance with a first embodiment of the present invention.

FIG. 1 shows an arrangement for handling communication messages in a building control system 102 that includes a control device 104, a communication circuit 106 and a communication network 110. The building control system 102 may suitably be a building automation system such as an HVAC system, a security system, a fire safety system, or other system related to the comfort, safety and/or security of a building or group of buildings. The building control system 102 includes, in addition to the control device 104, a plurality of remote building control system devices $108_1$, $108_2$, ... $108_N$.

The building control system devices $108_1$, $108_2$, ... $108_N$ include the devices that carry out the building control operations within various areas of the building or facility. To this end, the building control system devices $108_1$, $108_2$, ... $108_N$ may suitably include field controllers (sometimes referred to as field panels) that connect to building control endpoint devices such as ventilation dampers, temperature sensors, thermostats, water valves, smoke detectors, sprinkler systems and other devices. In some cases the building control system devices $108_1$, $108_2$, ... $108_N$ constitute controllers for the endpoint devices, whether or not the controllers are disposed in a field panel. Additionally, some endpoint devices, for example, temperature sensors, may include the ability to communicate data on a digital communication network. In such cases, the building control system devices $108_1$, $108_2$, ... $108_N$ may include such endpoint devices themselves.

The building control system devices $108_1$, $108_2$, ... $108_N$ are interconnected via the communication network 110, which may suitably be an Ethernet-based local area network, wireless area network, or combination of multiple LANs and/or WANs. Other communication networks suitable for use in a building control system may also be used. To this end, the building control system devices $108_1$, $108_2$, ... $108_N$ all have the capability to communicate over the network 110 using communication messages. The communication messages may use any suitable protocol, including but not limited BACnet, LON and even proprietary protocols.

The communication circuit 106 is a circuit operable to communicate messages on the communication network 110 with many or all of the remote building control system devices $108_1, 108_2, \ldots 108_N$. In general the communication circuit 106 is operable to receive communication messages or queries from applications running on the control device 104 and to provide a physical layer interface to effectuate communications to the appropriate building control system device $108_x$ using the appropriate protocol. The communication circuit 106 is operably connected to communicate such messages to building control system devices $108_1, 108_2, \ldots 108_N$ over the communication network 110.

Such communication circuits are known in the art and may include, by way of example, an Ethernet network interface card or similar Ethernet interface. It will be appreciated that the control device further includes message protocol interface software, such as BACStac, available from Cimetrics, which may be configured to communicate using BACnet over Ethernet Protocol. The message protocol interface software may suitably execute on processing equipment within the Ethernet network interface card, but will typically be executed on a main processing circuit of the control device 104 itself.

The communication circuit 106 is also operable to receive messages from the building control system devices $108_1, 108_2, \ldots 108_N$ over the communication circuit 110. The communication circuit 106 is operable to provide such received messages to the control circuit 104.

The control device 104 is operably coupled to the communication circuit 106. As discussed briefly above, the control device 104 is operable to execute applications that from time to time require that data be communicated to and/or from at least one of the building control system devices $108_1, 108_2, \ldots 108_N$. To this end, the control device 104 requests and/or causes the communication circuit 106 to transmit messages to building control devices over the communication network 110. The control device 104 is further operable to receive reply messages from the building control devices over the communication network 110 via the communication circuit 106.

For example, the control device 104 is operable to generate data queries and/or control commands for one or more of the building control system devices $108_1, 108_2, \ldots 108_N$. Such messages are communicated to the building control system devices $108_1, 108_2, \ldots 108_N$ via the communication circuit 106. The control device 104 is furthermore preferably operable to generate the messages such that they have a predefined communication format. For example, the control device 104 preferably includes a software application that formats message in an open protocol format such as BACnet or LON, which are known in the art. The control device 104 is configured to provide then formatted messages to the communication circuit 106, which then adds the physical layer overhead.

As is known in the art in building communication systems, building control system devices $108_1, 108_2, \ldots 108_N$ are operable to generate a reply or response messages system device responsive to query messages generated by the control device 104 and the communication circuit 106.

In accordance with at least some embodiments of the invention, the control device 104 is operable to perform a first operation if the responsive message is received within a first time-out period, and is operable to perform a second operation if the responsive message is received after a first time-out period has expired. By way of example, if the responsive message is received within a first time-out period, then the control device 104 may then provide the received message (or parts of it) to a building control application of the control device 104. For example, the responsive message may include information for use by a data display or archiving application, an alarm application, or a reporting application. However, if the responsive message is not received within the first time-out period, then the control circuit 104 may discard or ignore the message without passing it on.

In accordance with aspects of at least one embodiment of the invention, the control device 104 is also operable to generate a plurality of different time-out period values corresponding to the plurality of building control system devices $108_1, 108_2, \ldots 108_N$. The plurality of different time-out period values including a value identifying the time-out period for each device.

To accomplish the foregoing tasks, the control device 104 includes a processing circuit 104a, and in at least some embodiments includes at least a first user input device 104b, at least a first user output (e.g. display) device 104c, and memory 104d. The control device 104 may suitably be a desktop or laptop general purpose computing device that is configured for use as a control station in a building control system, such as, for example, the INSIGHT™ control station available from Siemens Building Technologies, Inc of Buffalo Grove, Ill. In such a system, the control device 104 may be co-housed with the communication circuit 106. As discussed above, the communication circuit 106 may indeed share some of the processing capability of the processing circuit 104a of the control device 104.

In an exemplary operation, the control device 104 generates a plurality of time-out values for each of the building control system devices $108_1, 108_2, \ldots 108_N$. The time-out values may all be the same, but will typically be different. To this end, it is noted that different building control system devices $108_1, 108_2, \ldots 108_N$ may be located at different locations within the building, some much more remote from the control station 104 than others. For example, consider a case in which the building control system device $108_1$ relatively close (physically, or at least with respect to the communication network 106), and the building control system device $108_N$ is located at another end of the building. The time-out value associated with the device $108_1$ will typically be smaller than the time-out value associated with the device $108_N$. The disparity in time-out values allows for longer times of response to distant devices and shorter times of response for nearer devices. This allows for the fact that natural communication delays can vary for distant devices, where communication messages transmitted to the distance device must negotiate one or more switches or routers.

In an exemplary time-out value setting operation, the control device 104 maintains a time-out value for each of the building control devices $108_1, 108_2$ and $108_N$. In this example, it will be assumed that the time-out value corresponding to building control device $108_1$ is 3 seconds, the time-out value corresponding to the building control device $108_2$ is 3 seconds, and the time-out value corresponding to the building control device $108_N$ is 7 seconds.

The control device 104 may suitably obtain the time-out values by sending test messages to each of the building control devices $108_1, 108_2$ and $108_N$ and recording the response time. The time-out value may then be determined either by a human operator or by the control device 104 based on the corresponding response time. For example, the time-out value may be chosen to be the test message response time with an additional "buffer" time added in. An illustration of this is provided herebelow.

Specifically, consider a situation in which a response to a test message for a building control device is received in less than 0.5 seconds, then the corresponding time-out value may suitable be 3 seconds. However, if a response to a test message is received in 2.8 seconds, then the corresponding time-out value may be 7 seconds.

In any event, the control device 104 stores the time-out values and the building control devices $108_1$, $108_2$ and $108_N$ to which they correspond.

At some subsequent time, the control device 104 during ordinary (i.e. not test) operation may formulate a message requesting data from the building control device $108_2$. The communication circuit 106 provides the data request message to the communication network 110 addressed for the building control device $108_2$. If a responsive message is received from the building control device $108_2$ in less than the corresponding time-out value, four seconds, then the control device 104 provides the responsive information contained within the responsive message to the application in the control device 104 for which the data was originally requested. If, however, the responsive message is not received in less than four seconds, then the control circuit 104 proceeds as though the communication failed in any suitable manner. For example, the control circuit 104 may suitably provide a "time-out", "error" or "failure" indication to another application running in the control circuit 104. In such a case, the control device 104 may then continue other operations without awaiting a response to the request. If the information is still needed by the control device 104, then the control device 104 may generate a new request for the communication circuit 106 to transmit a message requesting data from the building control device $108_2$.

At another subsequent time, the control device 104 during ordinary (i.e. not test) operation may formulate a message requesting data from the building control device $108_N$. The communication circuit 106 provides the request message to the communication network 110 addressed for the building control device $108_N$. If a responsive message is received from the building control device $108_N$ in less than the corresponding time-out value, in this case seven seconds, then the control device 104 uses the information in a building control application. If, however, the responsive message is not received in less than seven seconds, then the control device 140 proceeds as though the communication failed, and may suitably generate a "time-out", "error" or "failure" indication to another application in the control device 104.

Thus, the control device 104 uses different time-out values for different devices $108_1$, $108_2$ . . . $108_N$, which allows for different nominal or normal communication times between the communication circuit 106 and each device $108_1$, $108_2$ . . . $108_N$.

Figure 2:
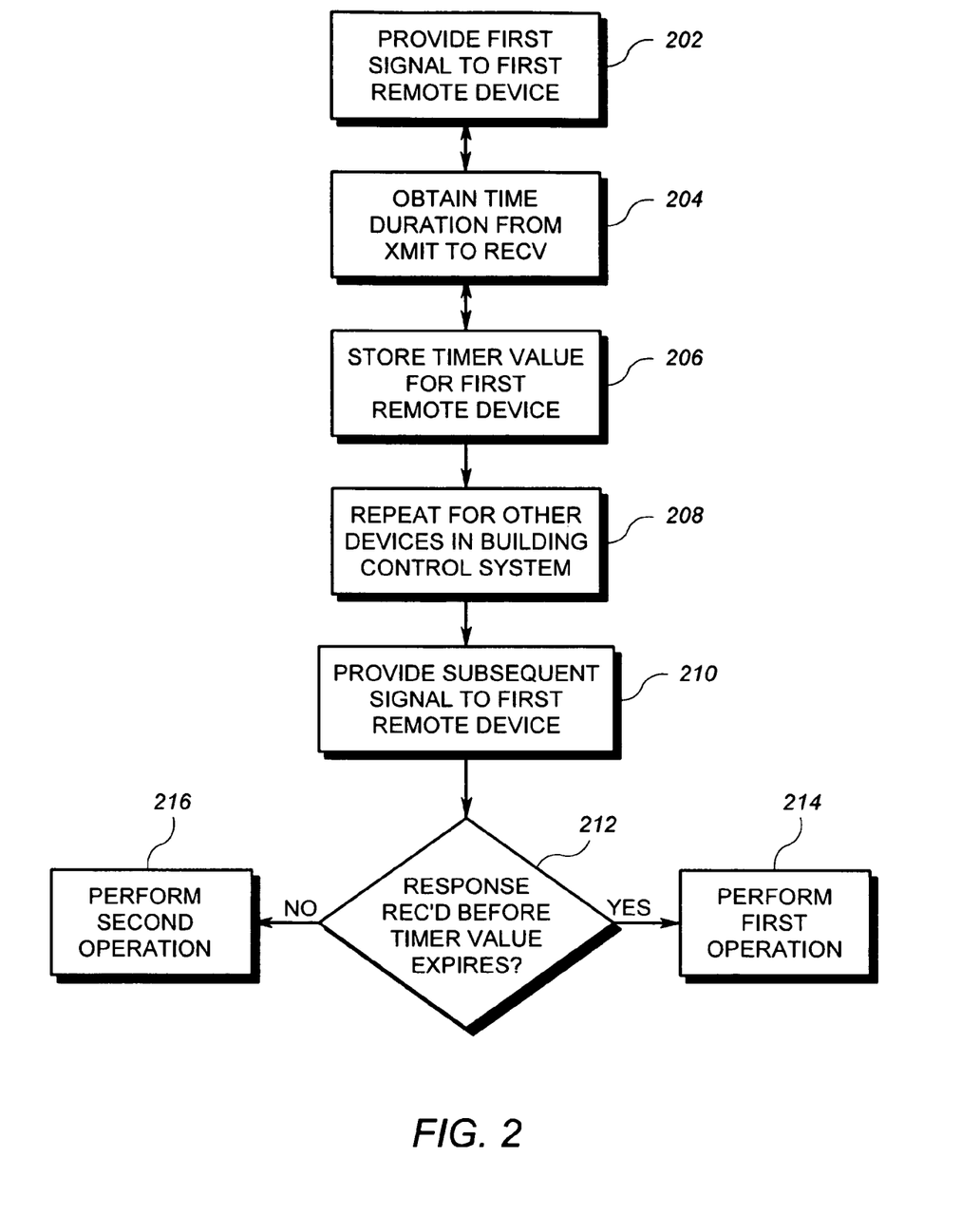
FIG. 2 shows a flow diagram of an exemplary method that may be carried out by a building control system including but not limited to the building control system of FIG. 1.

FIG. 2 shows in further detail an exemplary set of operations that may be performed by a control device and corresponding communication circuit within a building control system to process communication message within the building control system. The operations of FIG. 2 are described with reference to the arrangement of FIG. 1, but are not limited to use in such a system. The operations of FIG. 2 may be used in building control system arrangements having other capabilities and/or other configurations, so long as the arrangement includes a communication circuit and remote building control devices coupled to each other via a communication network.

Referring specifically to FIG. 2, in step 202 a first circuit (such as a combination of the control device 104 and the communication circuit 106 of FIG. 1) provides a first signal to a remote building control system device via the communication network 110 of a building control system 102. In step 204, a time duration between the transmission of the first signal and reception of a responsive signal from the remote building control system device in the first circuit is obtained.

In an example, the control device 104 may cause the communication circuit 106 to transmit a first signal in the form of a test signal to the building control system device $108_1$ in step 202. The control device 104 (and/or communication circuit 106) may then determine the how much time passes before the building control system device $108_1$ responds to the test signal.

Referring generally to the method of FIG. 2, step 206 is performed after step 204. In step 206 a timer value corresponding to the remote building control system device $108_1$ is stored in a memory, such as a memory of the control circuit 104. The timer value preferably exceeds the time duration obtained in step 204.

Continuing with the example describe above, after the control device 104 determines how long it took to receive a response from to the test message (i.e. test response time) from the building control system device $108_1$ (step 204), the control device 104 obtains and stores a time-out value (Step 206). The time-out value is preferably derived from the test response time and should exceed the test response time. The control device 104 may determine the time-out value automatically, or may receive the time-out value as input from a user via the input device 104b. In the latter case, the control device 104 preferably displays the test response time 104c to the user to allow the user to determine an appropriate time-out value.

Referring again generally to FIG. 2, in step 208, steps 202 to 206 may be repeated to store timer values corresponding to a plurality of other remote building control system devices. Thus, for example, test message response times may be obtained and corresponding time-out values stored for the building control system devices $208_2$, . . . $208_N$.

In step 210, a subsequent signal from the first circuit to the remote building control system device $208_1$ is provided. Continuing with the above referenced example, at some later point the control device 104 will attempt to send a message to the building control system device $108_1$ (via the communication circuit 106) as part of normal building control system operations. For example, the control device 104 may request a temperature value that is stored or maintained in the building control system device $108_1$. The control device 104 then awaits a response that contains the temperature value.

In step 212, it is determined whether a responsive signal from the remote control building control system device has been received within a time duration that is less than the time-out value. If so, then a first operation is performed in step 214. The first operation may include providing the information to another software application. If, however, the answer in step 212 is in the negative, then a second operation is performed in step 216. The second operation may include informing another software application of a communication error. However, the other operation may include generating repeating step 210.

Thus, in the example described above, the control device 104 determines whether the building control system device $108_1$ was able to respond to the temperature value request within a time duration that is less than the time-out value. If so, then the control device 104 may use that information in the building control application that requested the temperature information. If not, however, then the control device 104 performs operations consistent with a communication failure with respect to that particular request message. For example, the control device 104 may provide an "error" indication to the building control application that requested the information. As a result, the building control application that requested the information is not unduly delayed or "locked up" waiting for a responsive message.

Thus, the above described exemplary method involves performing a test communication operation (steps 202, 204) to derive a time-out or timer value (step 206), and then using the time-out value in normal communication operations (steps 212, 214 and 216).

Figure 3:
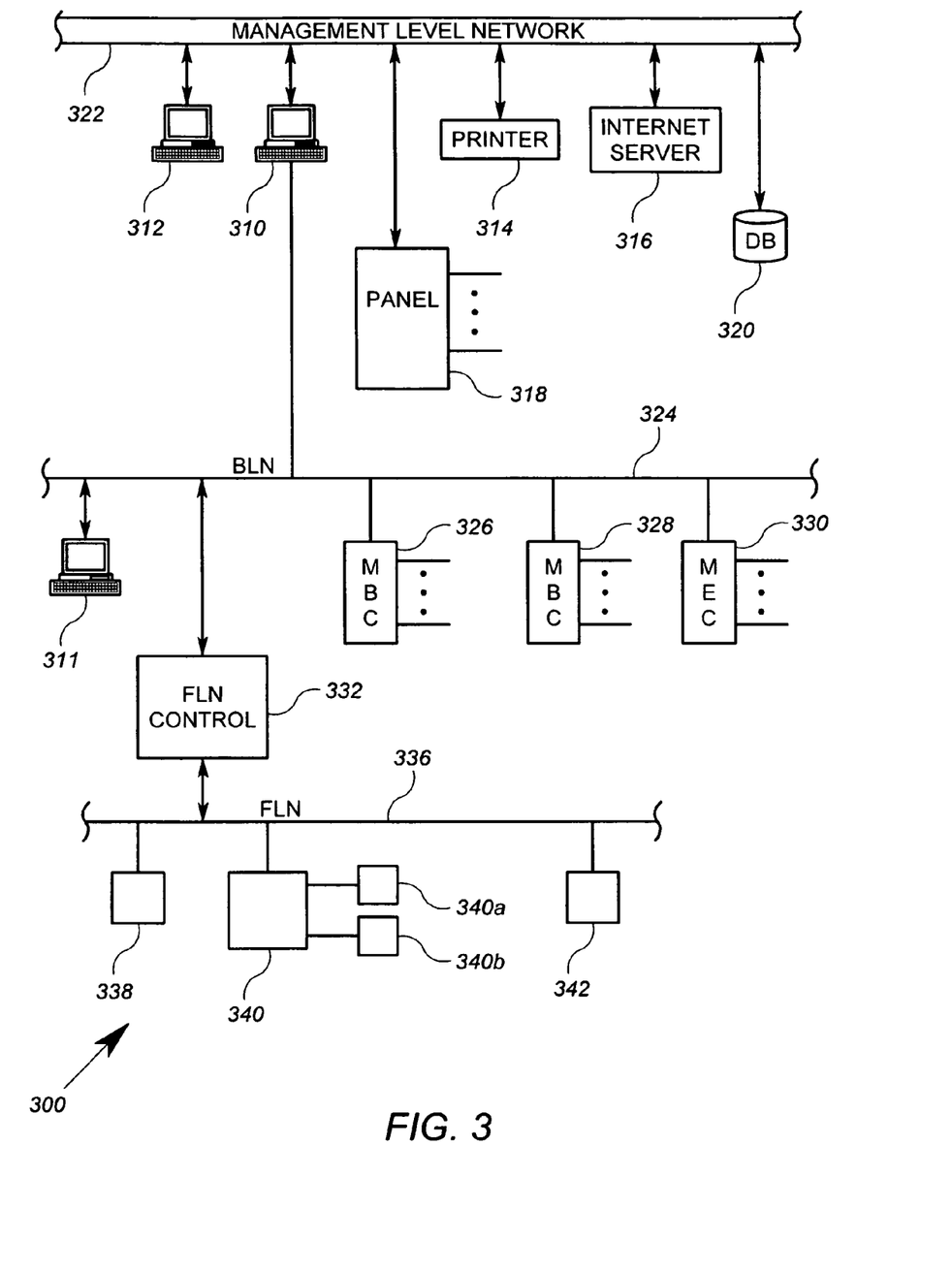
FIG. 3 shows in further detail a schematic diagram of a building control system that incorporates an embodiment of the invention.

FIG. 3 shows in further detail a building control system 300 that incorporates all or some of the elements of system 102 of FIG. 1 and is capable of performing the operations shown in FIG. 2.

The exemplary embodiment of the building control system 300 in FIG. 3 has the general architecture of commercially available building control systems, including but not limited to the APOGEE® System available from Siemens Building Technologies, Inc. of Buffalo Grove, Ill. In accordance with the present invention, the building control system 300 of FIG. 1 further includes a control station 310 that is operable to provide both control over the building control devices of the system 300 and further perform the operations of the control device 104 and communication circuit 106 described above in connection with FIGS. 1 and 2. To this end, the control station 310 may suitably include at least all of the physical elements of the control device 104 described above in connection with FIG. 1.

Those of ordinary skill in the art will readily appreciate that the use of the inventive control station 310 and/or methods described herein are in no way limited to the system 300 of FIG. 3, but instead may readily be incorporated into any building system that includes distributed devices and a control station that communicates directly or indirectly with such devices via a network.

The building system 300 of FIG. 3 includes three levels of networks to accommodate modularity and scalability. Low level or floor level networks (e.g. network 336) are typically small deterministic networks with limited flexibility or bandwidth, but which provide for control data communication between locally controlled devices. Building level networks (e.g. building level network 324) are medium level networks that are the backbone of the building control system 300. A building level network typically connects to several floor level networks, field panel devices, and possibly large equipment, and further is connected to the control stations that allow for monitoring of all system data. Building level networks must have significant bandwidth, but do not require open access. In the embodiment described herein, the building level network 324 in the embodiment described herein is an Ethernet-based network that supports an IP protocol. The management level network 322 is a high level network used for interfacing with internal and external workstations, data repositories, and printing devices. The management level network 322 in the exemplary embodiment described herein is an open protocol network (e.g. Ethernet) that enables remote access to data within the system 300.

The building level network 324 is responsible for relaying data throughout the building control elements (i.e. ventilation damper controllers, chiller plant controllers, temperature sensors, alarm systems). At least some of the building control elements communicate using a BACnet open protocol over IP, as is known in the building control system art.

Referring now specifically to FIG. 3, the building control system 300 includes a first control station 310, a second control station 312, a printer 314, an internet server 316, a control panel 318, and a database 320 all operably interconnected via the management level network 322. The management level network 322 may suitably be an Ethernet standard network that employs the TCP/IP protocol. The control station 310 is further connected to the building network 324, which in the embodiment described herein is also an Ethernet standard network.

The printer 314 and internet server 316 are standard components as is known in the art. The control panel 318 is an Ethernet-ready control panel that may be used to connect to another network of building control devices, not shown. The database 320 may suitably be a database server and includes memory for storing data regarding the structure of the system 300, as well as archived data regarding the operation of the system 300.

The control station 310 is a device that includes a user interface and is operable to provide user control over (and/or monitoring of) the building control elements/devices of the system 300 in a manner which may suitably be the same as that provided by the model INSIGHT® Work Station used in connection with the APOGEE®, discussed above. The INSIGHT® Work Station is also available from Siemens Building Technologies, Inc, of Buffalo Grove, Ill. To provide such control, the control station 310 communicates building control data to and from such devices (directly or indirectly) over the building network 324.

The building control system 300 further includes various building control devices, such as modular building controllers 326, 328, modular equipment controllers 330, and floor level network controllers 332, which are operably connected to the building network 324. The building control devices 326, 328, 330 and 332 all communicate using the BACnet protocol, and control, detect, and/or measure environmental parameters of the building, either directly or indirectly. Such parameters include temperature, air quality, smoke detection, fire detection, and other parameters normally controlled, detected and/or measured by HVAC systems, building security systems and/or building fire safety systems. Such devices are known in the art. By way of example, the modular equipment controller 330 may control an air handling unit of a building, not shown.

The floor level network controller 332 is further connected a floor level network 336. The floor level network 336 is a low level network that may employ either an open communication protocol or a proprietary protocol, and which connects to further building control devices. Exemplary building control devices of the system 300 which are connected to the floor level network 336 include unitary controllers 338, terminal equipment controllers 340, and variable speed drives 342. Other HVAC, fire safety, security, and building (or factory) automation devices are well known in the art and may be connected to the floor level network 336 or the building level network 324.

It is noted that the modular building controllers 326 and 328 may connect to other floor level networks, not shown, which include other building control devices, not shown. Thus, the system 300 is expandable and modular. Moreover, the building level network 324 may include routers and switches, not shown, but which are known in the art. These elements allow for modular expansion of the building level network 324. However, such devices can add delay for communications between remote devices on the building level network 324. Some delay due to intervening routers and switching equipment is to be expected, and is not considered a malfunction of the system.

In any event, the various building control devices generate building control information from time to time. For example, the terminal equipment controller 340 may be used to regulate temperature in a particular physical space or room. To this end, the terminal equipment controller 340 may be connected to a temperature sensor 340a. In such an example, the terminal equipment controller 340 obtains and/or may access building control information in the form of the temperature sensor readings from the sensor 340a. In another example, a motion sensor of a building security system, not shown, may generate a signal indicative of detected motion.

Also from time to time, an operator may use the control station 310 to request a subset of the available building control information generated by the building control devices. The control station 310 obtains such information via the interlinked networks and devices is described further below. The control station 310 furthermore uses time-out values for each of at least some of the building control system devices to determine whether communications are taking too long and should be aborted or repeated.

In addition, an operator may also use the control station 310 to provide a "command" to one or more of the building control devices. Such commands are provided to the various building devices through the same networks and devices. For example, a command may be used to set a desire temperature, or temperature set point, for a room, space or entire building. The control station 310 also uses time-out values to determine whether acknowledgement of a command is taking too long.

Figure 4:
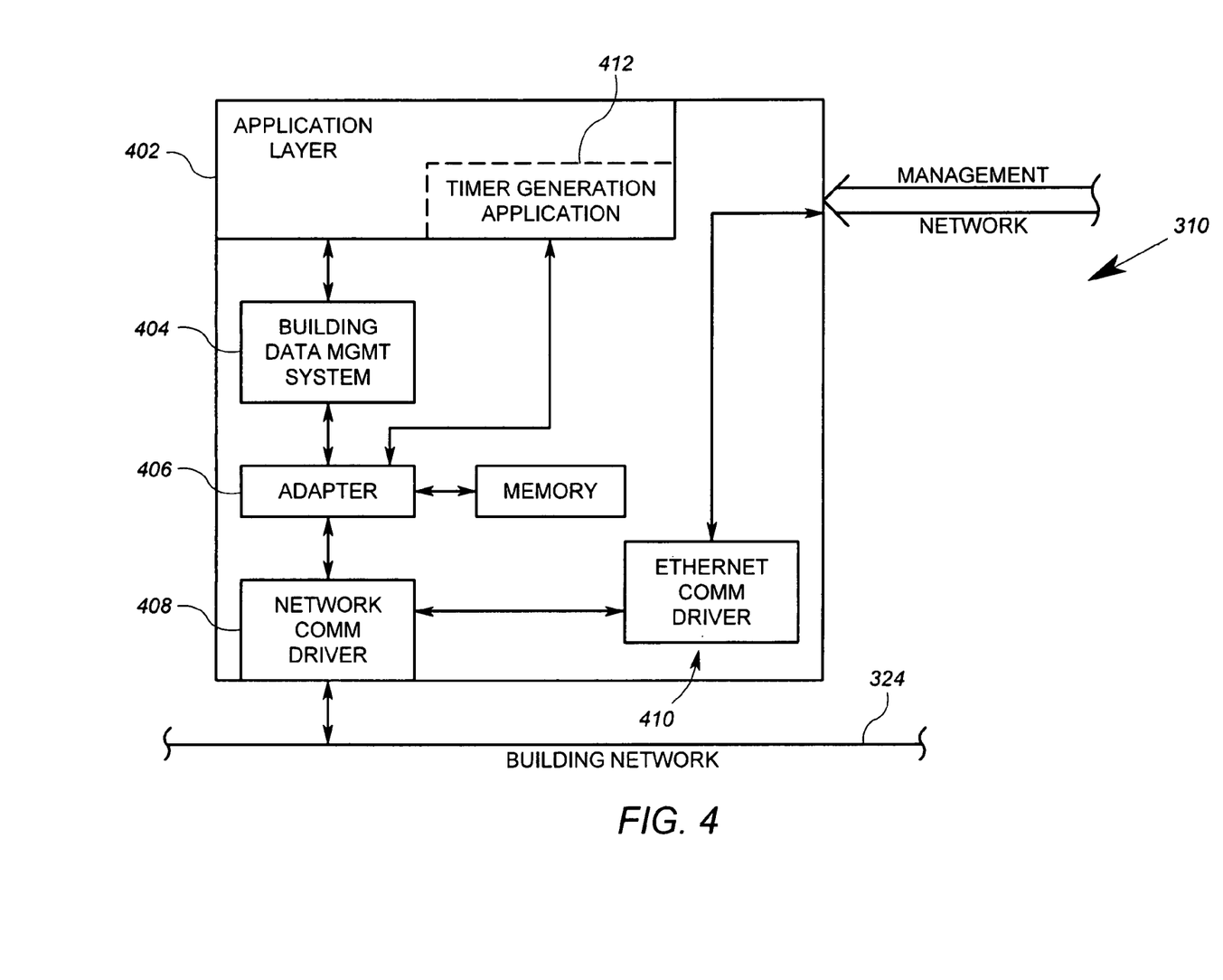
FIG. 4 shows in further detail a control device that may be used in the building control system of FIG. 3.

Referring to FIG. 4, the control station 310 may suitably be a general purpose computer which can include one or more expansion cards or modules to carry out particular communication operations. FIG. 4 shows a functional block diagram of the control station 310. The functional blocks shown in FIG. 4 are carried out by a suitably configured combination of hardware and software within the control station 310. As discussed above, the hardware may suitable include the elements of the control device 104 of FIG. 1. Thus, while operations may be said to be carried out by functional blocks of the control station 310, it should be considered that the operations are being carried out by a combination of a processing circuit such as the processing circuit 104a of FIG. 1, and software executing on the processing circuit.

Referring specifically to FIG. 4, the control station 310 includes an application layer 402, a building data management system (client/server combined in this case) 404, an adapter 406, a network communication driver 408, and a memory 414 either associated with, accessible to, or allocated to the adapter 406. The control station 310 further includes a network communication driver 410 for the management level network 322. Because the management level network 322 and the building control network 324 may both be Ethernet networks, the network communication drivers 408 and 410 may be combined.

The application layer 402 provides all user interface functions as well as special control applications. The application layer 402 allows user interface through inputs and display outputs such as the input 104b and output 104c of FIG. 1.

The building data management system 404 includes, among other things, the data server that controls, among other things, 1) the obtaining of data from remote system devices via the building level network 324 pursuant to requests made by the application layer 402, 2) the communication of commands from the application layer 402 to remote system devices via the building level network 424, and 3) the obtaining of alarm information from the remote system devices via the building level network 324. The building data management system 404 is preferably operably connected to obtain other data from, and communicate data to, the database 320. By way of example, an application on the application layer 402 may request certain data from the building data management system 404 from time to time, perform operations on the data, and then store the data on the database 320 using the management level network 322. Such operations are known in the building control system art.

The adapter 406 is a device driver application that converts or maps data between the format employed by the application layer 402/building data management system 404 and the format employed by the various building control devices. As is known in the art, various building system devices employ various formats of data and/or units of data. The adapter 406 operates to convert between the various formats and a common data format used by the building data management system 404. In the exemplary embodiment described herein, the adapter 406 includes the ability to convert between the format of the building data management system 404, which may suitably be a proprietary format, and the BACnet open protocol. To this end, the adapter 406 includes the BACstac software available from Cimetrics.

The adapter 406 is further configured to perform, for each message initiated, a first operation if a responsive message is received within a stored time-out value, and a second operation if a responsive message is not received within the stored time-out value. Preferably, the adapter 406 has access to time-out values stored in the memory 414, wherein a specific stored time-out value corresponds to each of the plurality of building control devices shown in FIG. 3 that communicate on the building level network 324 using BACnet.

The network communication driver 408 is the device that adds the physical protocol layers (i.e. Ethernet) necessary for communication over the building network 324.

Referring to FIGS. 3 and 4, two exemplary operations of the building system 300 are described below. The first operation involves satisfying a request for a data value for a particular network point or device. The second operation involves adjusting a set point or data value in the facility.

Data Value Reporting

Many operations of the building system 300 involve the reporting of data from individual building system devices or points. To illustrate such operations, an example is described below in which a temperature value is reported for a particular room. It will be assumed for the purpose of the example that the temperature value is reported responsive to a request generated within the application layer 402. In particular, assume that the application layer 402 requests a temperature value as measured by the temperature sensor 140a.

It is noted that several applications within the application layer 402 may be able to generate such a request. For example, the application layer 402 preferably has an application that allows a user to enter a temperature value request via a graphical user interface (or text interface) directly on the control station 310. Alternatively, the application layer 402 has another application that allows for requests for data to be received from an external device via the management level network 322. Such applications may take many forms. Moreover, instead of a request for the particular device, the request may be formulated as a request for a temperature reading in the room in which the temperature sensor 340a is located.

In any event, the application layer 402 passes the request to the building data management system 404. The building data management system 404 receives the request and associates the request with a particular point or value available in the system, i.e. the temperature value measured by the temperature sensor 340a. The building data management system 404 further determines that the temperature data from the temperature sensor 340a is available from the terminal equipment controller 340 through the floor level network controller 332. Accordingly, the building data management system 404 generates a request for the temperature data of the sensor 140a from the floor level network controller 332. The building data management system 404 provides the request to the adapter 406.

The adapter 406 then translates the request for data into the BACnet message protocol, which is expected by the floor level controller 332. The adapter 406 then provides the request message to the network communication driver 408. The adapter 406 further starts a timer that preferably counts down from the stored time-out value corresponding to the floor level controller 332. The time-out value effectively represents a maximum time that the building data management system 404 and/or application 402 will wait for a response.

Upon receiving the request message, the network communication driver 408 adds the Ethernet physical layer overhead and causes the message to be transmitted over the building level network 324 to the floor level network controller 332. Accordingly, the message includes the BACnet-translated data request message received from the adapter 406 and further includes the building level network protocol/overhead layers added by the driver 408.

While the message may propagate to many devices (e.g. devices 326, 328, 330 and 332) on the management level network 324, only the floor network controller 332 receives (i.e. processes) the message. Under normal circumstances, upon receiving the message, the floor level network controller 332 obtains the requested temperature data from the terminal equipment controller 140. To this end, the floor level network controller 332 will typically store recent temperature data received from the terminal equipment controller 340 over the floor level network 336. In some cases, the floor level network controller 332 obtains such data in the normal course of operations, and thus, may respond to the request with information it already possesses. In other cases, the floor level network control 332 may generate a request for such information from the terminal equipment controller 340 upon receiving the request message from the control station 310.

In any case, the floor level network controller 332 obtains the temperature data that has been at some recent time generated by the temperature sensor 340a and provides the measurement data in a message format (i.e. BACnet over IP) compatible for transmission over the building level network 324.

The control station 310 receives the message from the building level network 324. More specifically, the network communication driver 408 receives the message from the building level network 324, and parses the temperature measurement data therefrom. As discussed above, the measurement data is disposed within the BACnet message format used by the floor level network controller 332.

The network communication driver 408 then passes or attempts to pass the message to the adapter 406. Upon receiving the message, the adapter 406 uses the BACnet driver and converts the data into the common data format used by the building data management system 404, provided that the timer that was started when the original request message was generated has not expired. The adapter 406 then provides the converted data to the building data management system 404, which, in turn, makes the data available to the application of the application layer 202 that requested the data. If, however, the timer within the adapter 406 has expired, then the adapter 406 does not provide the contents of the message to the building data management system 404.

Moreover, the adapter 406 would have notified the building data management system 404 that the timer has expired immediately (or shortly) after expiration of the timer, so that the resources of the building data management system 404 and/or the application layer 402 can be released from the open request. The notification of the timer expiration occurs independent of whether and when the late responsive message is actually received by the network communication driver 408.

In accordance with embodiments of the present invention, each device on the network 324 that uses BACnet has a specific corresponding time-out value which is stored in the memory 414.

System Command

Another exemplary operation involves the communication of a "command" message from the control station 310 to a building system device. In this example, an operator uses an application from the application layer 302 to generate a command, such as, for example, to set the temperature set point in a space or room of the building.

A temperature set point, as is known in the art, is a desired temperature that a building control system attempts to maintain within a certain space. For example, the temperature setting on a home thermostat is a "temperature set point". In the exemplary embodiment described herein, the terminal equipment controller 340 is configured to control the temperature in the space in which the sensor 340a is located. To this end, the terminal equipment controller is connected to a ventilation damper actuator 340b. The terminal equipment controller 340 may manipulate the temperature in the room by controlling the actuator 340b to open or close a ventilation duct damper, not shown. The terminal equipment controller 340 attempts to maintain the temperature at the sensor 340a approximately equal to the temperature set point by opening or closing the ventilation damper as needed. Such operations are known in the art.

Accordingly, one common example of a system command is one in which a temperature set point is communicated to a device such as the terminal equipment controller 340. The temperature controller 340 would then operate the actuator 340b to attempt to achieve and maintain the set point temperature. Such an example is described herebelow.

The building data management system 404 receives the command or request from the application layer 402, and determines where to send the command. In particular, the building control system data server 404 determines that commands for the terminal equipment controller 340 should be sent through the floor level network controller 332. The building data management system 404 provides the command and the destination information to the adapter 406. The adapter 406 again formulates an appropriate BACnet message for the destination device (i.e. the floor level network controller 332) that includes the command. The adapter 406 provides the converted command to the network communication driver 408, and again, starts the count-down timer from the stored time-out value for the floor level network controller 332. The network communication driver 308 adds the building level protocol/overhead layers and transmits the message to the floor level controller 332 via the building level network 304. The floor level controller 332 obtains the command data from the message and then communicates the command data to the terminal equipment controller 140 using the floor level network 136. The terminal equipment controller 340 would thereafter manipulate the actuator 340b to attempt to maintain the room temperature at the newly received set point.

The floor level controller 332 also generates an acknowledgement message for the building data management system 404 and/or application 402 regarding the receipt of the command. The acknowledgement may suitably be generated when the command is originally received by the floor level controller 332 via the building control network 324, or when the terminal equipment controller 340 confirms that it has received the command from the floor level controller 332. The floor level controller 332 addresses the acknowledgement message to the control station 310 and sends the message over the building level network 324.

The control station 310 receives the acknowledgement message from the building level network 324. More specifically, the network communication driver 408 receives the acknowledgement message from the building level network 324, and passes or attempts to pass the contents of the message to the adapter 406. If the count-down timer that was started when the original command message was generated has not expired, then the adapter 406 uses the BACnet driver and converts the data into the common data format used by the building data management system 404. The adapter 406 then provides the converted acknowledgement information to the building data management system 404, which, in turn, makes the acknowledgement available to the application of the application layer 402 that requested the data. If, however, the timer within the adapter 406 has expired, then the adapter 406 does not provide the contents of the message to the building data management system 404.

Moreover, if the timer had expired, then the adapter 406 will have notified the building data management system 404 that the timer had expired immediately (or shortly) after expiration of the timer, so that the resources of the building data management system 404 and/or the application layer 402 can be released from the open request. The application layer 402 and/or the building management data system 404 may then, if desired, cause another command message to be generated. In this manner, command messages may be repeated until the receipt of the command message is acknowledged in a timely manner.

Generating Time-Out Values

In addition to the above described operations, which occur in connection with normal building control operations, the application layer 402 is further operable to perform an application that allows for time-out values to be generated for various devices on the building level network 324, such as the floor level network controller 332, the modular building controllers 326, 328 and the modular equipment controller 330.

To this end, the application layer 402 includes a timer generation application 412 that allows a user to obtain test message response times, and define different time out values for devices on the building level network 324 based on the test message response times. In particular, in the exemplary embodiment described herein, the timer generation application 412 allows a user to perform a test in which a test message response time is obtained for one or more of the devices connected to the building control network 324. The user may then select a time-out value for each of the devices based at least in part on the test message response time. In an alternative embodiment, the timer generation application 412 may automatically determine, on a periodic basis, the time-out value for each of a plurality of devices on the network based on the test message response times for the corresponding devices.

Figure 5:
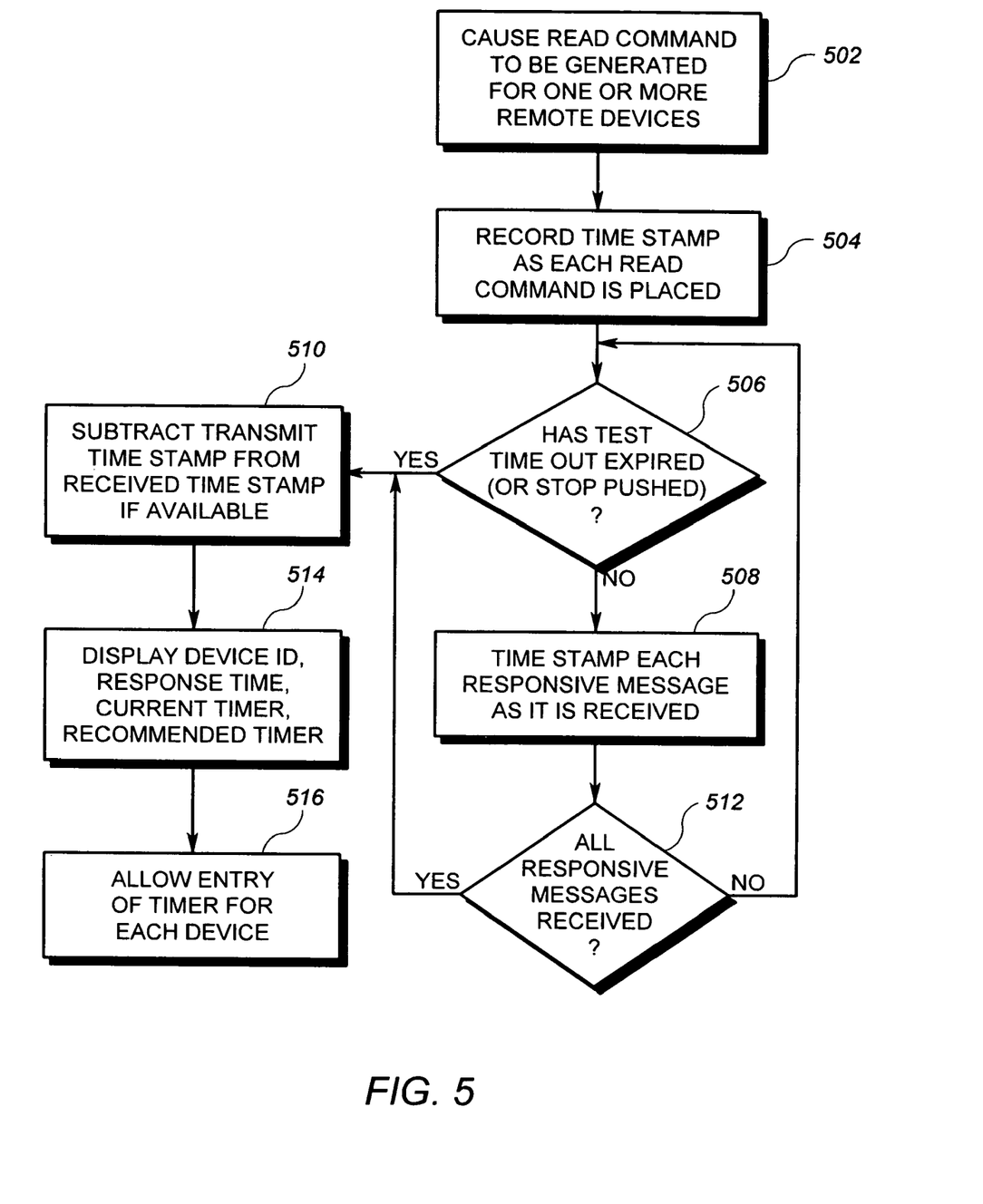
FIG. 5 shows a flow diagram of an exemplary set of operations performed in an application of the control device of FIG. 4 to obtain test response times for a plurality of devices in the building control system of FIG. 4.
Figure 6:
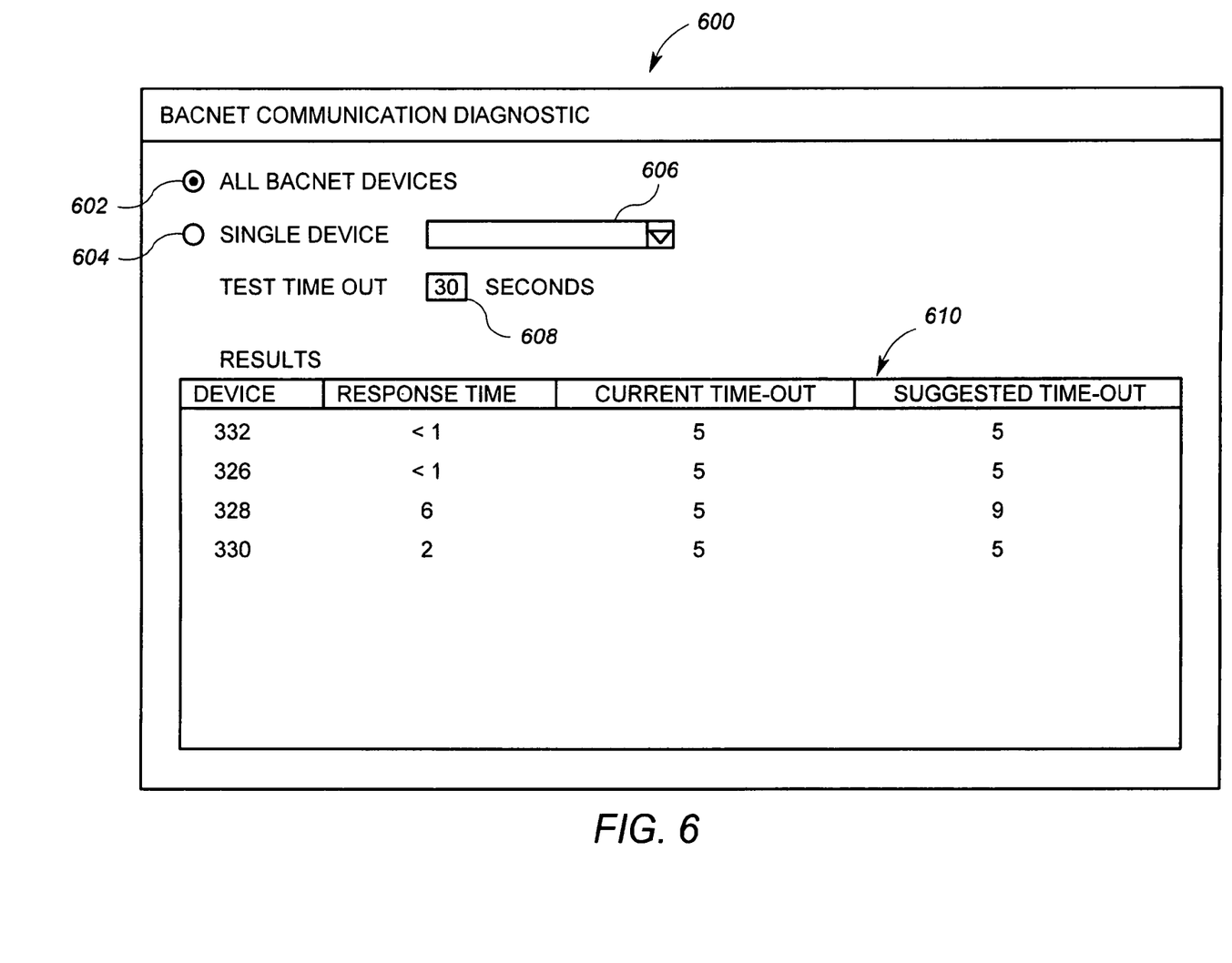
FIG. 6 shows an exemplary screen display that may be used to display options for configuring a response test and to display the results of the test.

FIG. 5 shows an exemplary set of steps that may be performed by the timer generation application 412 to perform the response time test and obtain user-entry of a timer value. FIG. 6 shows an exemplary interactive display screen 600 that may be generated by the application 412 while performing the operations of FIG. 5.

In particular, the display screen 600 includes interactive objects that allow for entry of various test parameters, such as identification of whether all devices on the network 324 are to be tested as opposed to just a single device. In the exemplary display screen 600 of FIG. 6, the user has selected to test all devices on the network 324 via selection circle 602. If the user had selected a single device via selection circle 604, then the user would be asked to identify the device to be tested in the drag-down menu selection box 606. The detailed construction of such interactive graphical devices are well known in the art.

As shown in the screen shot 600, the user may also select a maximum time-out for the test messages generated during the test. While the ultimate purpose of the test is to establish per-device time out value, the test itself requires a time-out to ensure that the test does not continue indefinitely in the event that a communication error occurs during the test itself. To this end, the user may select a test time-out value in the text entry box 608 of the display screen 600.

Once the test parameters are identified, the user may select to run the test using a displayed button or the like, not shown. FIG. 6 also shows a results box 610, which only appears after the test is completed. Accordingly, description of the results box 610 will be provided further below after description of the test operations performed by the timer generation application 412.

The actual test operation is described particularly with respect to FIG. 5. In FIG. 5, the application 412 carries out the timer generation operations using the parameters entered by the user in the display screen 600 of FIG. 6.

In step 502, the application 412 causes a read data query message to be generated for each of the devices under test. As shown in FIG. 6, the user has selected that all devices are to be tested. Accordingly, in step 502, the application causes a separate read data query message to be generated for each of the BACnet compatible building control system devices on the building control network 324. In the exemplary embodiment described herein, the application 412 would therefore cause a read data query message to be generated for each of the devices 326, 328, 330 and 332. The read data query may suitably be a query requesting an identification string or value from each of the devices 326, 328, 330 and 332.

To this end, the application 412 causes the adapter 406 to generate the query messages in the BACnet protocol. The application 412 may cause the adapter 406 to generate the messages directly, or in other embodiments the application 412 may cause the building data management system 404 to cause the adapter 406 to generate the test read data query messages.

In step 504, the application 412 records a time stamp value for each of the read data messages sent. The adapter 406 thereafter generates the read data query messages, which are transmitted via the communication interface 408 over the building level network 324 to each of the devices 326, 328, 330 and 332 in the manner described further above.

In step 506, the application layer 412 determines whether the test time-out value has been exceeded since the test began. As discussed above, the user may enter the overall test time-out value in the display screen 600 in text entry box 608. In the alternative, the overall test time-out value may be automatically set to a predefined maximum value, for example 30 seconds. If the test-time out value has not been exceeded, the test continues and step 508 is executed. If, however, the test-time out value has been exceeded since the time-out value has begun, the test ends and step 510 is executed.

Until the test ends, the adapter 406 from time to time will receive reply messages from the devices 326, 328, 330 and 332 responsive to the test messages. It is the timing of the reply messages that is important to the test procedure of FIG. 5. Accordingly, if the test continues after step 506, then the application layer 412 in step 508 records a time stamp for each reply message as it is received. Each time stamp preferably identifies the time received and the device from which it was received.

During the test, the application 412 also determines in step 512 whether reply messages have been received from all of the devices for which the test is being performed. If so, then the test ends and the application 412 executes step 510. If not, however, then the application 412 returns to step 506 and continues the ensuing steps as described above until the test ends through either step 506 or step 512.

When the test does end, the application 412 in step 510 determines the test message response time associated with each of the devices under test. To this end, the application 412 subtracts the time stamp on original read data query message sent to each device from the time stamp on the reply message from the corresponding network device. For example, if the read data query message for the MBC 326 has a time stamp value generated in step 504 of "14:32:17.9" and the reply message from the MBC 326 has a time stamp value of "14:32:18.8", then the application 412 in step 510 determines that the reply time for the device MBC 326 is 0.9 seconds (14:32:18.8–14:32:17.9). Using this process, the application 412 in step 510 identifies the test message response time for all of the devices being tested.

Thereafter, in step 514, the application 412 causes a display identifying each device tested, the test message response time identified in step 510 for each device, a current (existing) time-out value stored for each device, and the recommended new time-out value for each device. Referring again to FIG. 6, the results window 610 shows a display that may be generated in step 514. The results window 610 contains a table wherein a test message response time value, a current time-out value, and a recommended time-out value are displayed for each of the devices 326, 328, 330 and 332. In the embodiment described herein, the test message response time is expressed in seconds, where fractions of a second below one are indicated simply as "<1" second.

The application 412 automatically generates the recommended time-out value for each device based on its corresponding test message response time. The recommended time-out value should exceed the test message response time for each device, but not by an excessive amount. In the embodiment described herein, the recommended time-out value is determined as five seconds or the test message response time plus three seconds, whichever is greater. It will be appreciated that other formulas for determining the recommended time-out value may readily be employed. In general, the recommended time-out value is preferably on the order of 3-5 seconds greater than the test message response time for the device.

As a result of step 514, the display 600 provides the user with information that is useful for determining an advantageous time-out value for responses to messages sent to each device on the building control network. First, the user may readily select the automatically-generated recommended time-out value. Second, even if the recommended time-out value is not adopted by the user, the user may generate a desired time-out value based on the test message response time displayed in the results window 610.

In any event, in step 516, the application 412 allows the user to enter a new time-out value for each of the devices 326, 328, 330 and 332. This may be accomplished by another interactive "button", such as the save button 616 in the screen 600 of FIG. 6 The application 412 provides the new time-out values to the adapter 406, which stores the new time-out values in the memory 414.

As discussed above, the application 412 may determine and store the new time-out values automatically in an alternative embodiment. For example, the recommended time-out value determined in step 514 may simply be adopted as the new time-out value to be stored in the memory 414. No user intervention or decision would then be required. However, it would be advantageous to at least allow the user to override an automatically-generated time-out value to accommodate for specialized needs or characteristics of a particular building control system.

In other alternative embodiments, the test message response time may represent an average or mean of several test message response times obtained through the repeated performance of steps 502-512 for each of the plurality of devices.

It will further be appreciated that the above described embodiments are merely exemplary and that those of ordinary skill in the art may readily devise their own implementations and modifications that incorporate the principles of the present invention and fall within the spirit and scope thereof.

We claim:

1. An arrangement for handling communication messages in a building control system, comprising:
   a communication circuit operable to communicate messages with building control system devices via a communication network,
   a control device operably coupled to the communication circuit, the control device operable to
      cause the communication circuit to communicate a first message to a first building control system device, the first message configured to cause the first building control device to generate a responsive message,
      perform a first operation if the responsive message is received via the communication circuit within a first time-out period, and perform a second operation if the responsive message is received via the communication circuit after a first time-out period has expired, and
      generate a plurality of different time-out period values corresponding to a plurality of building control system devices, the plurality of different time-out period values including a value identifying the first time-out period;
   wherein the control device includes a user-interface, and wherein the control device is operable to:
   generate a visible display on the user interface showing simultaneously time-out information corresponding to a set of two or more building control system devices and information identifying the set of building control system devices, the time-out information corresponding to at least one of the plurality of different time-out values.

2. The arrangement of claim 1, wherein the control device is further operable to receive time-out information from a user via the user interface, and wherein the control device is operable to provide a first of the plurality of different time-out values such that the first value is based on the received time-out information.

3. The arrangement of claim 1, wherein the control device is further operable to generate at least some of the plurality of different time-out values by performing a communication test.

4. The arrangement of claim 3, wherein the control device is operable to perform the communication test by causing the communication circuit to send a test message to at least one building control system device and obtaining a time duration passed before receiving a responsive message.

5. The arrangement of claim 4, wherein a first of the plurality of different time-out values corresponding to the at least one building control system device is derived from the time duration.

6. The arrangement of claim 3, wherein the control device is operable to perform the communication test by sending a plurality of test messages to remote building control system devices and, for each, obtaining a time duration passed before receiving a responsive message.

7. A method, comprising:
   a) transmitting from a first circuit a first signal to a remote building control system device via a communication network of a building control system;
   b) obtaining a time duration between transmission of the first signal and reception of a responsive signal from the building control system device in the first circuit;
   c) after step b) storing in a memory a timer value corresponding to the building control system device, the timer value exceeding the time duration;
   d) providing a subsequent signal from the first circuit to the building control system device;
   e) performing a first operation with a received signal responsive to the subsequent communication signal if the received signal is received in the first circuit before a time period equal to the timer value has passed since transmission of the subsequent communication signal from the first circuit, and performing a second operation otherwise; and
   f) displaying on a display a plurality of timer values corresponding to a plurality of building control system devices connected to the first circuit via the communication network.

8. The method of claim 7, wherein step a) further comprises providing in the first circuit the first communication signal such that the first communication signal employs a BACnet protocol.

9. The method of claim 7, wherein step c) further comprises using a processing circuit to automatically calculate the timer value based on the time duration.

10. The method of claim 9, wherein the first circuit includes the processing circuit.

11. The method of claim 7, wherein step c) further comprises replacing a previous timer value corresponding to the building control system device with the timer value.

12. The method of claim 7, wherein at least two of the plurality of timer values are different.

13. The method of claim 7, wherein step f) further comprises displaying information representative of an identity of the corresponding building control system devices proximate to the plurality of timer values.

14. An arrangement for handling communication messages in a building control system, comprising:
   a communication circuit operable to communicate messages with building control system devices via a communication network;
   a control device operably coupled to the communication circuit, the control device being configured to:
      cause the communication circuit to communicate a first message to at least one building control system device, the first message configured to cause the least one building control devices to generate a responsive message,
      determine a time duration passed between transmitting the first message and receiving the responsive message, and
      generate a recommended time-out period value for the at least one building control device based on the determined time duration; and
   a display screen operably coupled to the control device,
   wherein the control device is further configured to generate a visible display on the display screen showing time-out information pertaining to the at least one building control system device, the time-out information including identification information pertaining to the at least one building control system device, and the recommended time-out period value for the at least one building control system device.

15. The arrangement of claim 14, wherein the control device is further configured to generate the visible display such that the time-out information includes the determined time duration for the at least one building control system device.

16. The arrangement of claim 14, wherein the control device is further configured to generate the visible display such that the time-out information includes a current time-out value for the at least one building control system device.

17. The arrangement of claim 14, wherein the control device is further configured to receive input from a user via the user interface, the input identifying at least one time-out period value for the at least one building control system device.

18. The arrangement of claim 14, wherein the control device is configured to generate the visible display such that the time-out information includes identification information for a plurality of building control system devices and a recommended time-out period value for each building control system device in the plurality.

\* \* \* \* \*